United States Patent [19]

Stanescu et al.

[11] Patent Number: 5,554,836
[45] Date of Patent: Sep. 10, 1996

[54] INDUCTION HEATING IN LOW OXYGEN-CONTAINING ATMOSPHERE

[75] Inventors: Mircea S. Stanescu, Durham, N.C.; Paul F. Stratton, West Yorkshire, England

[73] Assignee: The BOC Group, Inc., Murrah Hill, N.J.

[21] Appl. No.: 247,447

[22] Filed: May 23, 1994

[51] Int. Cl.⁶ .................................................. H05B 6/16
[52] U.S. Cl. .......................................... 219/651; 219/656
[58] Field of Search .................................. 219/651, 656, 219/655, 618, 632

[56] References Cited

U.S. PATENT DOCUMENTS

| | | |
|---|---|---|
| 1,610,041 | 12/1926 | Cope . |
| 2,904,663 | 9/1959 | Emeis et al. . |
| 2,910,565 | 10/1959 | Osborn, Jr. et al. ............... 219/656 |
| 2,914,642 | 11/1959 | Porter et al. ....................... 219/651 |
| 2,957,064 | 10/1960 | Comenetz . |
| 3,656,910 | 4/1972 | Ferment . |
| 3,689,725 | 9/1972 | Hammer et al. .................... 219/651 |
| 3,860,737 | 1/1975 | Moscatello ....................... 219/651 X |
| 4,039,794 | 8/1977 | Kasper .............................. 219/656 |
| 4,147,432 | 4/1979 | Yamawaki et al. . |
| 4,188,519 | 2/1980 | Berg . |
| 4,202,690 | 5/1980 | Funke . |
| 4,370,357 | 1/1983 | Swartz . |
| 4,523,067 | 6/1985 | Brown et al. ..................... 219/651 X |
| 4,533,806 | 8/1985 | Kawasaki et al. ................. 219/651 |
| 4,721,836 | 1/1988 | Zeisse et al. ...................... 219/651 |
| 4,780,585 | 10/1988 | Rochas et al. . |
| 5,298,090 | 3/1994 | Garg et a. . |

FOREIGN PATENT DOCUMENTS

| | | | |
|---|---|---|---|
| 92698 | 4/1962 | Denmark ........................... 219/651 |
| 1090548 | 11/1967 | United Kingdom . |
| 2135032 | 8/1984 | United Kingdom . |
| 2253214 | 9/1992 | United Kingdom . |

Primary Examiner—Philip H. Leung
Attorney, Agent, or Firm—R. Hain Swope; David R. Draegert

[57] ABSTRACT

Apparatus and method of induction heating wherein the heating operation is conducted in a low oxygen-containing atmosphere by the introduction of an inert gas alone or in combination with an oxygen-reacting gas through the ends of the induction coil housing or through removable covers enclosing the spaces between spaced apart housings.

21 Claims, 10 Drawing Sheets

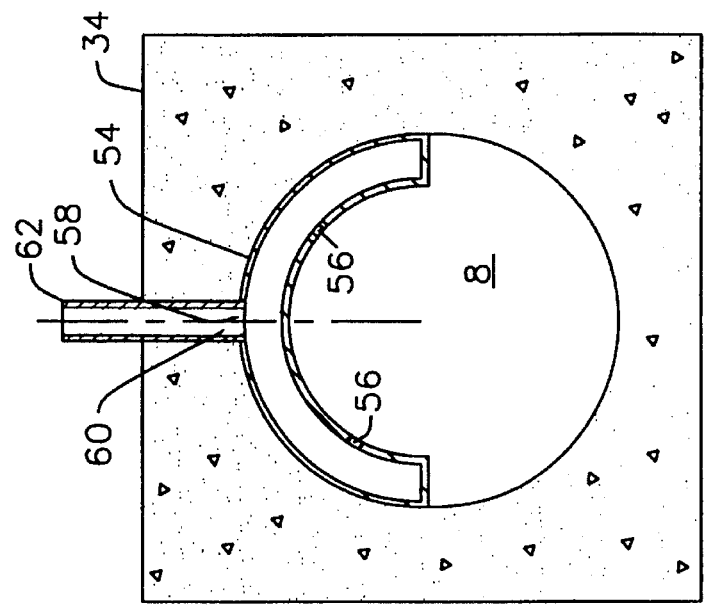
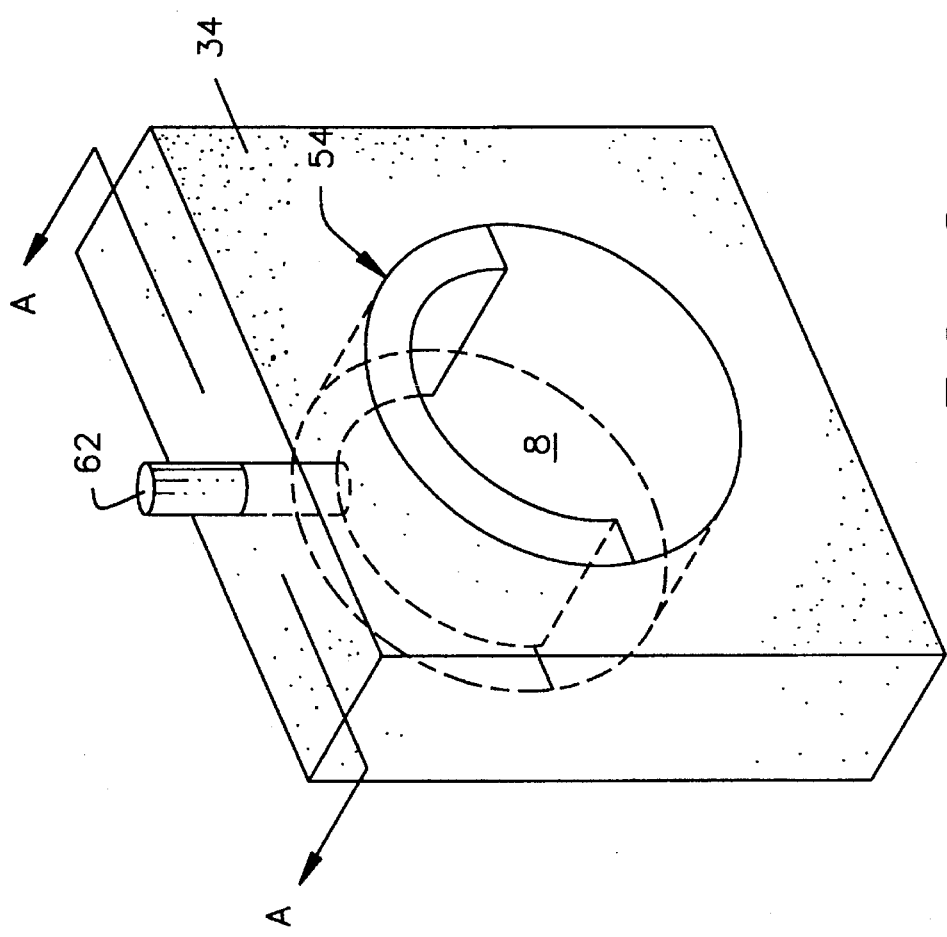
FIG. 8B
FIG. 8A

INDUCTION HEATING IN LOW OXYGEN-CONTAINING ATMOSPHERE

TECHNICAL FIELD

The present invention is directed to an induction heating apparatus and method which is conducted in a low oxygen-containing atmosphere through the injection of an inert gas.

BACKGROUND OF THE INVENTION

Induction heating is used to heat treat metal parts such as steel bars, slugs, billets, bar ends, tubes, slabs and the like by passing the metals through a pathway heated by an induction coil. A typical induction heating apparatus can have one coil being contained within a single refractory housing or more coils, aligned linearly, in separate housings. The metal parts are passed through the pathway and heated by the aligned induction coils.

Typical induction heating processes are carried out in an oxygen-containing environment such as air. The presence of oxygen, however, results in the formation of scale on the heated metal parts. Scale is an abrasive which significantly contributes to the wearing of the forging dies, reducing their useful life. Scale builds up within the housing thereby reducing the useful life of the induction coils.

There have been efforts to introduce an inert gas into the pathway of the induction heating apparatus to eliminate or at least substantially reduce the presence of oxygen. In those operations where the induction coils are contained in separate housings, a cover has been placed over the space between the housings to provide an air-tight enclosure. Multiple inlets have been provided in the cover to transport an inert gas from a source into the pathway contained within the cover. The inert gas then diffuses into the housing to provide a more acceptable gaseous environment for conducting induction heating and subsequent forging.

Such methods, however, suffer from a number of disadvantages. First, the covers are of unitary construction and are permanently affixed to the housing. When visiting the inductor, the cover must be destroyed to provide access to the pathway within the housing. Only after the cover is removed may the housing be visited for maintenance. Once the maintenance operation is complete, a new cover must be placed over the spaces between the housings. As is apparent, the destruction of the original cover and replacement with a new cover is time consuming and adds significantly to the cost of induction heating.

Another disadvantage of prior attempts at induction heating in an inert atmosphere involves the lack of control of the injection of the inert gas and the inability to provide a barrier against the infiltration of unwanted gases such as air due to drafting. More specifically, induction heating devices never achieve complete protection against air leaks. For example, it is known that air enters the induction heating apparatus through (a) the entryway where the cold metal parts enter the apparatus and (b) the exit where the heated parts leave the apparatus. In addition, air leaks may be present where the cover is attached to the housing of the induction heating apparatus. The infiltration of air into the heating areas produces scaling.

It would be of significant benefit in the art of induction heating to minimize scaling and to eliminate the need to replace the covers to provide access to the induction coil apparatus for maintenance. It would be of further benefit to provide greater control over the introduction of an inert gas into the induction heating apparatus.

SUMMARY OF THE INVENTION

The present invention is generally directed to an induction heating apparatus and method in which an inert gas alone or in combination with a gas capable of reacting with oxygen (i.e. an oxygen-reacting gas) is introduced into the device under controlled conditions to provide a heat treating environment which minimizes the development of scale and provides ready access to the device for maintenance.

More specifically, the present invention is directed to an induction heating apparatus that may have a single housing containing the induction coil heater as well as multiple spaced apart housings each containing a separate induction coil heater where the spaces between the housings are enclosed by a cover means.

An inert gas alone or in combination with a gas capable of reacting with oxygen (e.g. a hydrocarbon gas) is transmitted to the apparatus through a gas assembly. When the induction heating apparatus is comprised of a single housing or multiple housings, the gas assembly includes a flexible tube connected to a source of gas and a rigid tube that extends into the heating region of the apparatus longitudinally from at least one end of the housing or the end of the last housing. The rigid tube is typically made of ceramic and includes one or more openings therein allowing an inert gas alone or in combination with an oxygen-reacting gas to flow into the heating region. The gas assembly may be insertable into each end of the housing depending principally on the length of the housing.

In induction heaters employing multiple spaced apart induction coils, the gas can be supplied to the apparatus through the gas assembly at the ends of the apparatus or through an inlet within one or more of the covers.

In a preferred form of the invention, the rigid tube of the gas assembly is installed transversely to the inductor or housing within the cover. In this embodiment, the openings in the rigid tube are arranged so that the gas forms a gaseous curtain preventing ingress of air from the entryway and exit of the housing.

BRIEF DESCRIPTION OF THE DRAWINGS

The following drawings in which like reference characters indicate like parts are illustrative of embodiments of the invention and are not intended to limit the invention as encompassed by the claims forming part of the application.

FIG. 8A is a perspective view of an embodiment of the cover having a semicircular distribution insert for distributing the gas uniformly within the induction heating apparatus;

FIG. 8B is a cross-sectional view of the cover shown in FIG. 8A taken along line A—A;

DETAILED DESCRIPTION OF THE INVENTION

The present invention is generally directed to an induction heating apparatus and method in which an inert gas alone or in combination with an oxygen reacting gas is introduced to provide a low oxygen-containing atmosphere in the induction heating area. As used herein a low oxygen-containing atmosphere shall mean that the oxygen content within the induction heating area is less than about 1% by volume. An oxygen-reacting gas shall mean a gas that reacts with oxygen under conditions prevailing in the induction coil to produce one or more gases which do not detrimentally affect the induction heating operation.

The low oxygen-containing atmosphere is provided by the introduction of an inert gas alone or with the oxygen-reacting gas. Suitable inert gases include nitrogen, argon, mixtures thereof and the like. Nitrogen is the preferred inert gas and may be supplied from cryogenic sources and non-cryogenic sources such as pressure swing adsorption and membrane separation units. Suitable hydrocarbon gases include methane, ethane, natural gas, methanol, mixtures thereof and the like.

Figure 1:
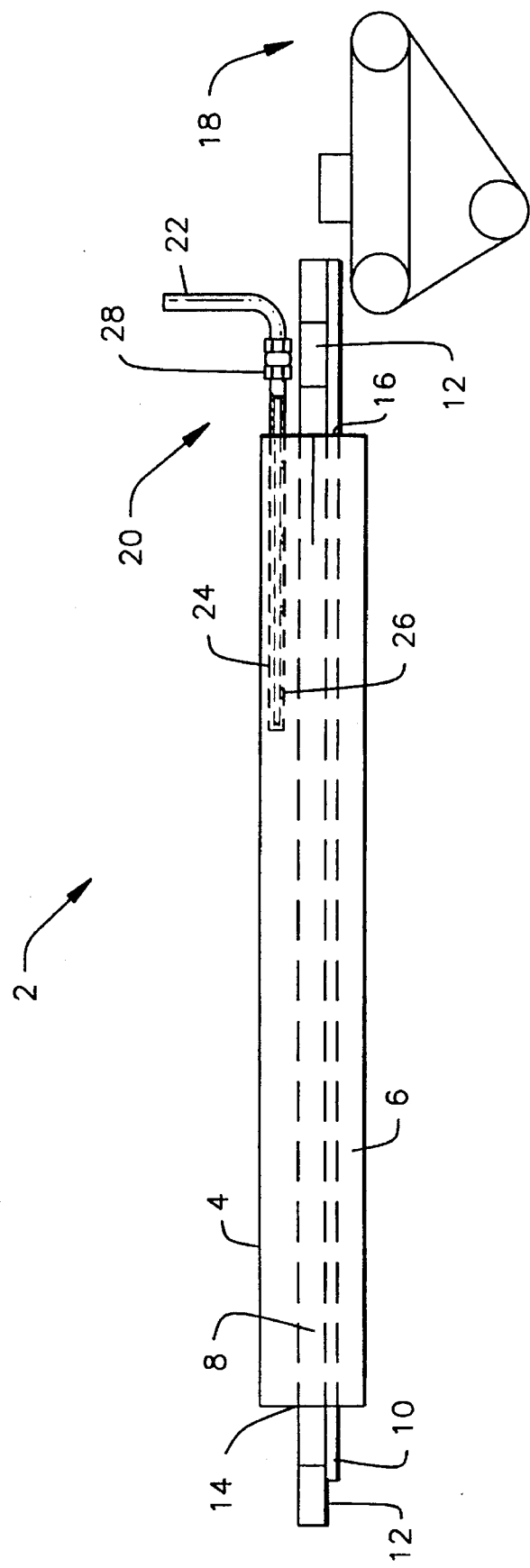
FIG. 1 is a schematic side view of one embodiment of the induction heating apparatus of the present invention having a single gas assembly entering one end of a single housing containing multiple induction coils.

Referring to the drawings and particularly to FIG. 1 there is shown a first embodiment of the invention in which multiple induction heating coils are contained within a single housing. An induction heating assembly, shown generally by the numeral 2 includes a housing 4 enclosing therein an induction coil shown for location purposes only by the numeral 6. The operation of the induction coil is conventional and forms no part of the present invention. Accordingly, details of the structure and electrical circuitry common to induction coils which may be used herein have been omitted.

The housing 4 is typically made of a refractory material and has an opening through the length thereof defining a pathway for the passage of the objects to be heated. As shown in FIG. 1, the pathway 8 contains a conveyor 10 for transporting the metal parts to be heated 12 (e.g. billets of steel). The cold parts enter the housing 4 through an inlet 14. After heating, the metal parts leave the housing 4 through an outlet 16 where they are transferred to a conventional conveyor assembly 18 for cooling and further processing (e.g. forging).

In accordance with the present invention, an inert gas alone or in combination with an oxygen-reacting gas is provided to the pathway 8 to create a low oxygen-containing atmosphere where the parts 12 are heated by the induction coil 6. The gas is provided by a gas assembly 20 which in the embodiment shown in FIG. 1 comprises a flexible tube 22 connected to a rigid, preferably ceramic tube 24 having openings 26 therein for allowing the gas to leave the assembly 20 and enter the pathway 8. The rigid tube 24 in the embodiment shown in FIG. 1 extends longitudinally of the pathway 8 and may be rotatable.

Figure 4:
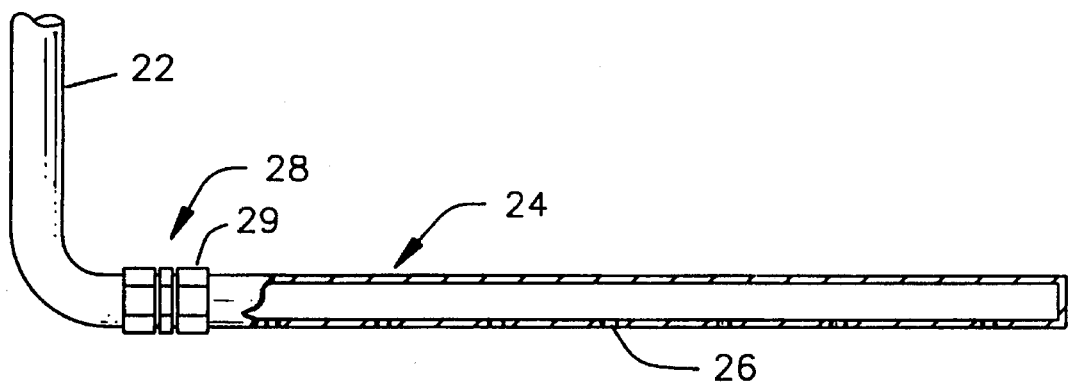
FIG. 4 is a side view in partial cross-section of an embodiment of the gas assembly in which a flexible tube is connected to a source of gas and a rigid ceramic tube is placed in proximity to the heating region of the apparatus.
Figure 5:
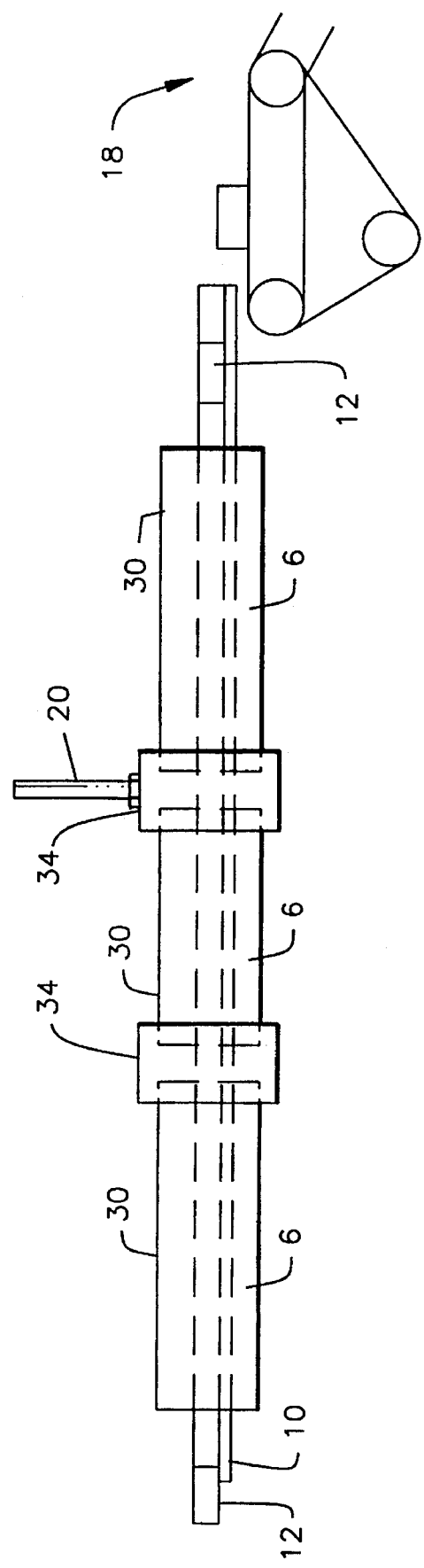
FIG. 5 is another embodiment of the invention showing multiple housings connected by covers with one of the covers shown operatively connected to a gas assembly.

As shown best in FIG. 4, the flexible tube 22 and the rigid tube 24 are connected together through a coupling device 28 so that the gas is free to pass from the flexible tube 22 to the rigid tube 24. The coupling device may allow rotation of the rigid tube 24 by employing a conventional rotatable coupler 29.

The flexible tube 22 is made from a flexible, heat resistant material such as a stainless steel flexible hose, rubber and the like. The rigid tube 24 must be resistant to temperatures of up to 2500° C. or more, typical of induction heaters, in view of its proximity to the heating area of the assembly 2. Accordingly, the rigid tube 24 is preferably made of ceramic or other suitable heat resistant and thermal shock resistant material.

Figure 2:
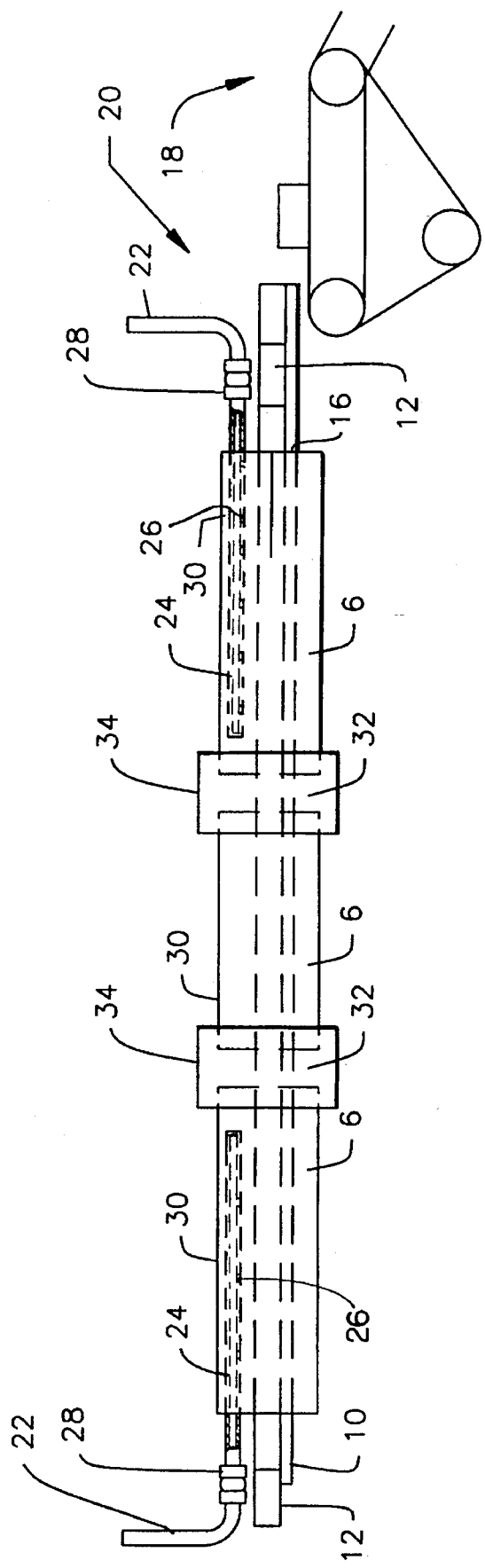
FIG. 2 is a schematic side view of another embodiment of the invention in which the induction coils are contained within separate housings and a gas assembly is provided at each end of the heating apparatus.

The rigid tube 24 extends into the assembly 2 through either or both of the inlet 14 and outlet 16 of the housing 4. As shown specifically in FIG. 1 the gas assembly 20 is inserted into the outlet 16. A dual system of gas injection, where the gas assembly 20 is inserted into both the inlet 14 and the outlet 16, is shown in FIG. 2 as explained hereinafter. The gas which leaves the rigid tube 24 through the openings 26 diffuses through the entire pathway 8. The level of gas provided to the pathway 8 can be adjusted by increasing the flow rate of the gas and/or by increasing the size of the openings 26.

Figure 3:
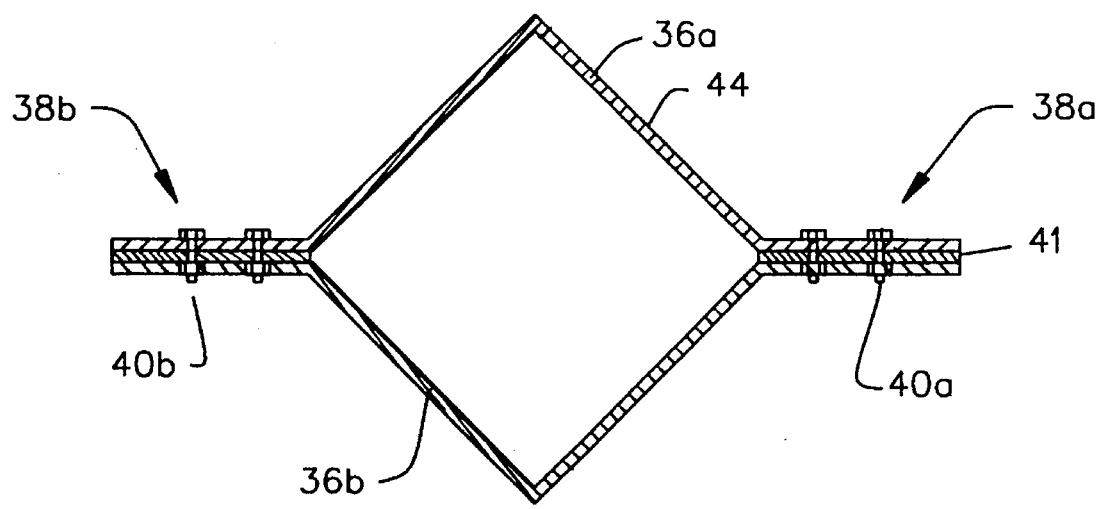
FIG. 3 is a side view in cross-section of one embodiment of the removable cover employed in the present invention.

In a second embodiment of the invention, multiple housing units 30, each containing a single induction coil 6 (shown for location purposes only), are shown in FIG. 2. This embodiment of the invention enables access to the induction coils through spaces 32 present between adjacent housing units 30. In accordance with one aspect of the present invention, the spaces 32 are enclosed by removable covers 34. As shown in FIG. 3, the cover 34 comprises a pair of cover members 36a and 36b which are releasably connected together at respective ends 38a and 38b. In the embodiment shown specifically in FIG. 3, each of the ends 38a and 38b are releasably connected together with bolts 40a and 40b which can be removed to allow the cover members 36a and 36b to be disengaged from each other. Disengagement of the cover members 36a and 36b exposes the space 32 and thereby allows access to the induction coils 6 and the pathway 8. When the cover is operatively enclosing the space 32, the ends 38a and 38b may be separated by a sealing device 41 such as a gasket to improve air tightness of the enclosure.

As previously indicated, when induction heating is performed in a low oxygen-containing environment, scaling is reduced. A reduction in scaling increases the life expectancy of the dies and induction coils. The extent to which scaling is reduced is dependent in part on how consistent the gas is delivered to all heating areas contained within the induction heating assembly. Accordingly, it may be desirable to introduce the gas intermediate the inlet and outlet ends of the assembly.

Referring to FIGS. 5 to 7B, there is shown an embodiment of the invention where the gas is introduced to the pathway intermediate the inlet and outlet ends through the covers. One of the covers 34 is connected to a gas assembly 20 of the type shown in FIG. 4. It should be understood, that although only one cover is equipped with a gas assembly 20, up to all of the covers 34 may be so equipped.

Figure 6:
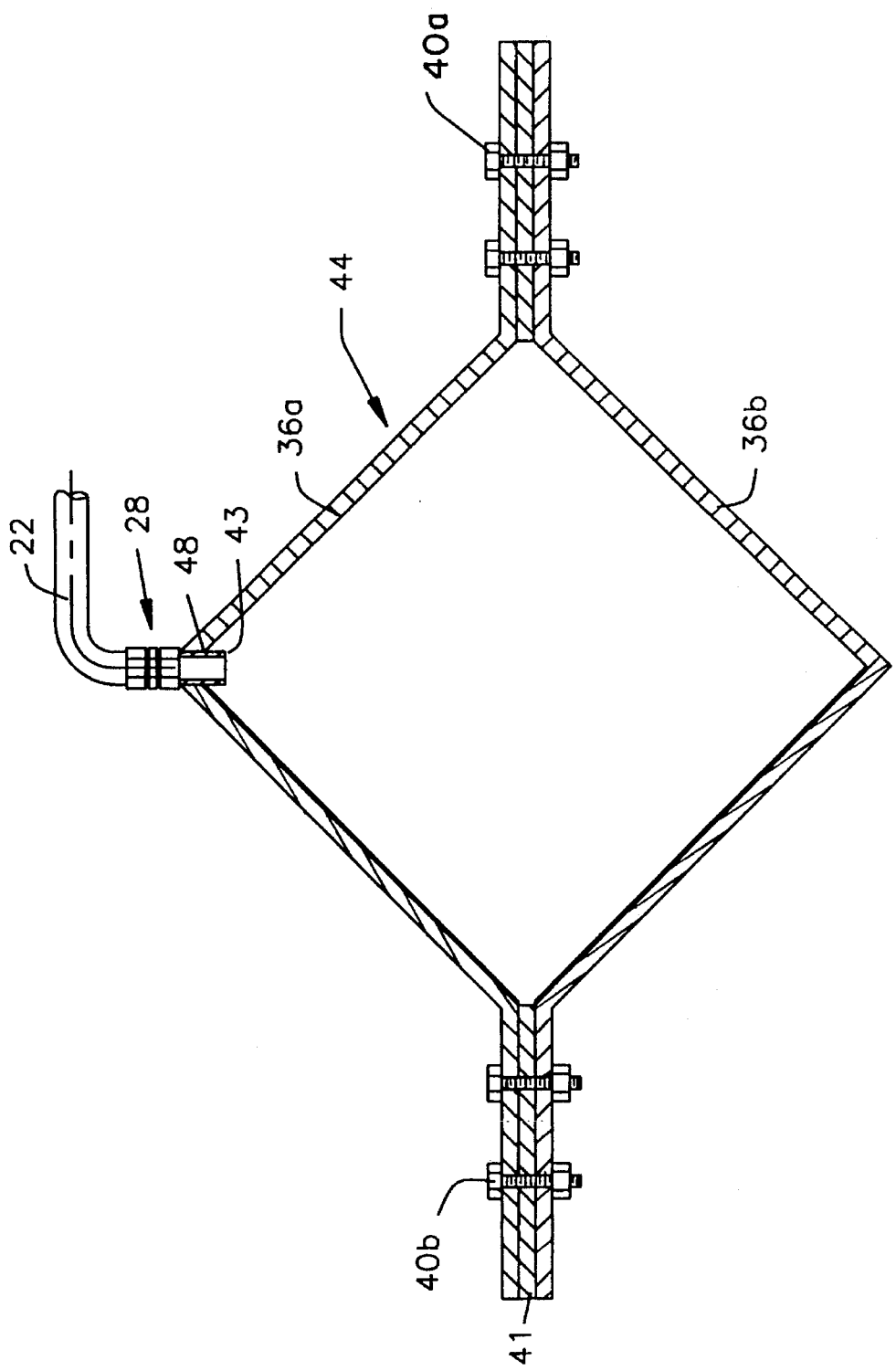
FIG. 6 is a side view in cross-section of the cover shown in FIG. 5.

The gas assembly 20 extends into the cover 34 through an opening 48 as shown in FIG. 6. The rigid tube, identified by numeral 43, is installed preferably transversely to the inductor to deliver the gas and to establish a gaseous curtain which prevents air from entering the heating region. As explained hereinafter, the length of the rigid tube 43 and its proximity to the pathway containing the object to be heated is dependent on whether an oxygen-reacting gas is added to the heating region.

Figure 7A:
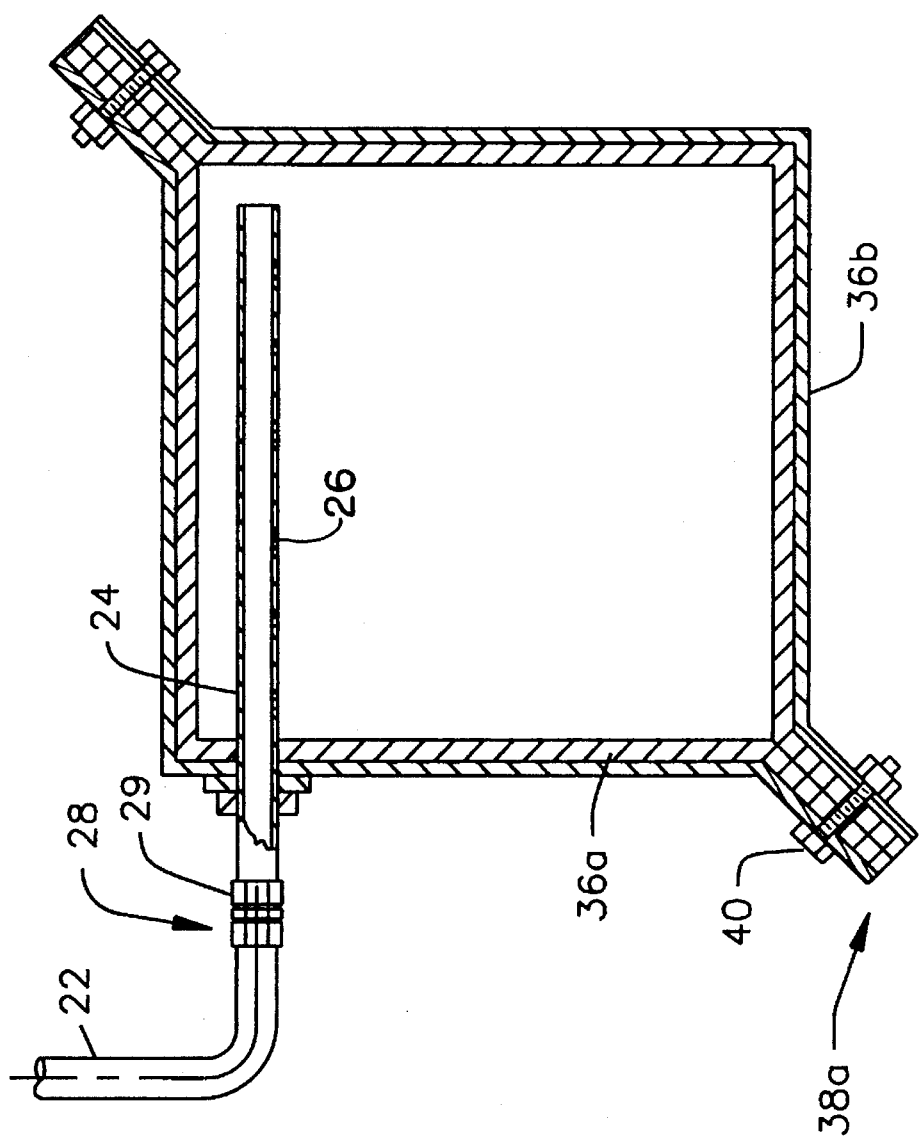
FIG. 7A is a side view in cross-section of another embodiment of the cover with the gas assembly operatively connected thereto transverse to the pathway.

As shown specifically in FIG. 7A, the gas assembly 20, and particularly the rigid, transversely positioned tube 43 extends through the outer surface 44 of the cover 34, to provide gas into the pathway. The rigid tube 43 has spaced apart openings 26 allowing the inert gas to travel from the assembly 20 into the pathway.

The rigid tube 43 is preferably rotatable within the cover 34 to provide more flexibility regarding the delivery of the gas. Rotation of the rigid tube 43 can be achieved by rotating the coupler 29 of the coupling device 28 forward or backward until the openings 26 are in the desired position. In a preferred embodiment of the invention, the openings 26 are positioned as shown in FIG. 7A to thereby direct a curtain of the gas downwardly and transversely of the pathway. The resulting curtain of gas prevents air from gaining entry into the pathway in vicinity of the induction coils.

Figure 7B:
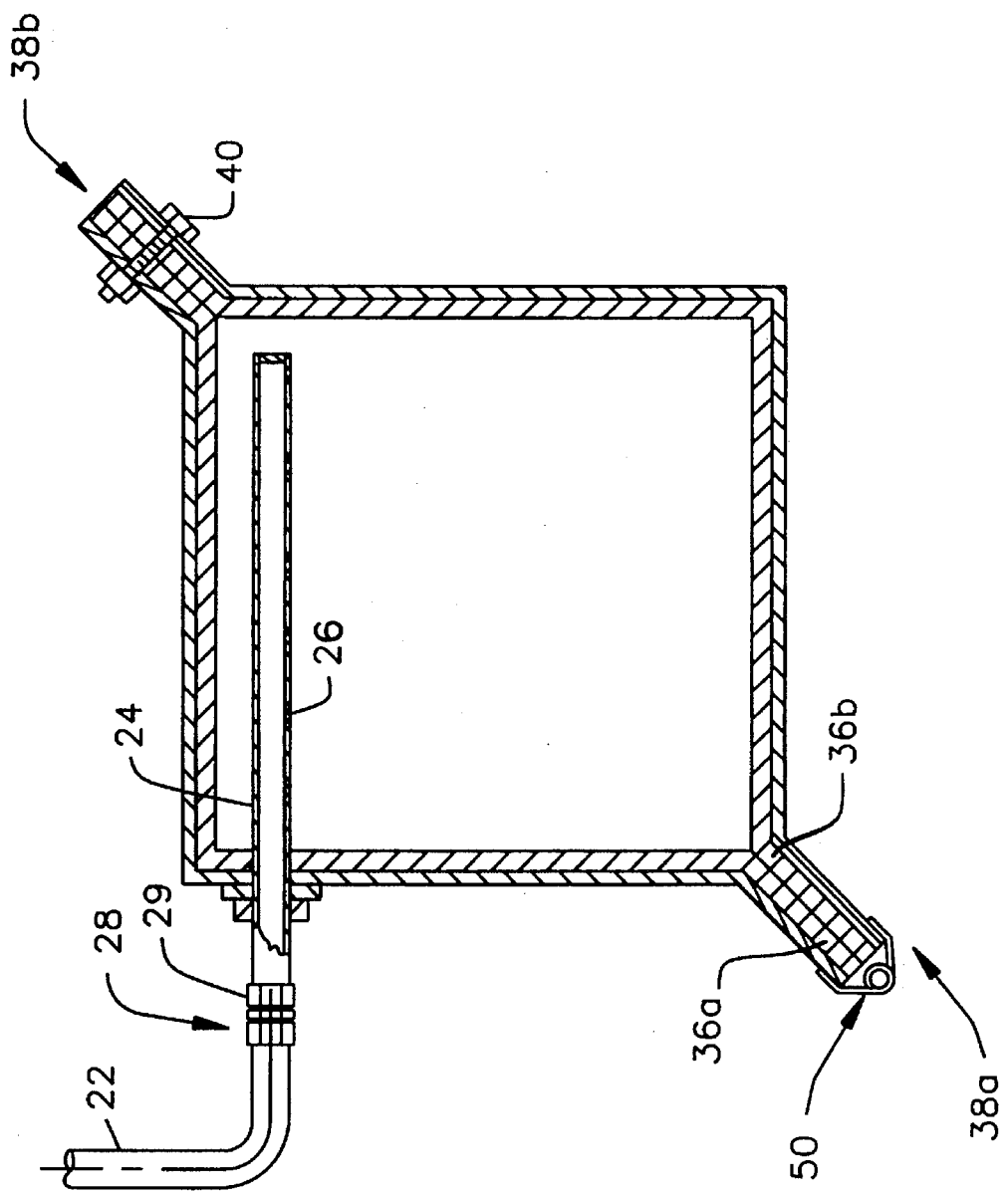
FIG. 7B is a side view in cross-section similar to FIG. 7A showing a cover having a hinge connecting the cover members.

In the embodiment of the invention shown in FIG. 7A, the cover members 36a and 36b are attached to each other through a single bolt 40. As shown in FIG. 7B, one of the ends 38a of the cover 34 may have the cover members 36a and 36b hingedly attached to each other. More specifically, a hinge 50 is connected to each of the cover members 36a and 36b at the respective ends thereof. When access to the space 32 between the housing units 30 is desired, the bolt 40 connecting the ends 38a and 38b is disengaged and the cover members 36a and 36b are separated from each other about the hinge 50 allowing access to the pathway and the induction coils 6. When the maintenance operation is complete, the cover members 36a and 36b are moved in the opposite direction about the hinge 50 and reattached through the bolt 50. Once the cover 34 is secured about the space 32, the induction heating operation may be restarted.

The cover 34 may be provided with means for uniformly distributing the inert gas throughout the pathway 8. As shown in FIGS. 8A and 8B the gas assembly 20 is connected to a gas distributor such as a semicircular ring 54 having spaced apart openings 56 for distributing the gas within the pathway 8. The upper surface 58 of the ring 54 has an opening 60 therein allowing fluid communication with a tube 62 in communication with a source of the gas. In operation, the gas flows from a source (not shown) into the tube 62 where it enters the opening 60 of the ring 54. The gas continues into the ring 54 and then flows out of the openings 56 into the pathway 8 to provide a uniform distribution of the gas within the heating region.

As previously indicated the length of the rigid tube and its proximity to the pathway containing the object to be heated is selected based on the composition of the gas injected into the induction heating apparatus. More specifically, the short rigid tube 43 shown in FIG. 6 may be used to inject an inert gas into the induction heating apparatus. The inert gas does not react with any oxygen that may be present in the pathway. Accordingly, it is not necessary to extend the rigid tube into close proximity of the pathway where the induction coil temperature is at its highest to promote a reaction with the oxygen gas.

Figure 9A:
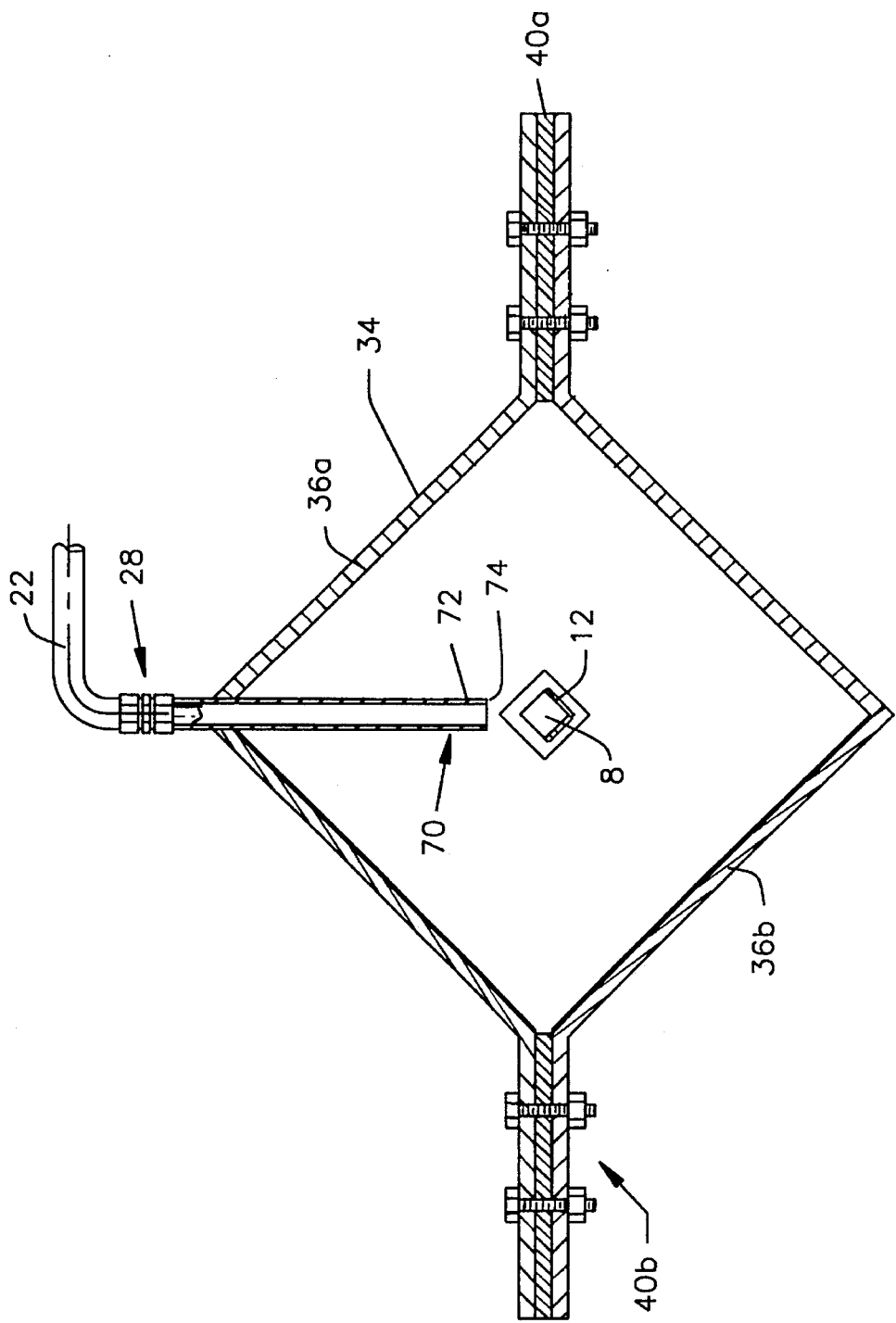
FIG. 9A is a cross-sectional view of an embodiment of the cover particularly adapted for the introduction of an inert gas and an oxygen-reacting gas in which the rigid tube extends close to the pathway.

Where, however, an oxygen-reacting gas such as a hydrocarbon gas, is mixed with the inert gas, elevated temperatures are desirable to insure that oxygen reacts with the oxygen-reacting gas. Referring to FIG. 9A, there is shown an embodiment of the removable cover 34 having a rigid tube 70 which extends into close proximity to the pathway 8 containing the parts 12 (e.g. billets) to be heated. Openings 72 may be provided along the tube 70 and/or a single opening 74 at the end of the tube. The temperature in vicinity of the pathway 8 which may exceed about 2300° C. is sufficient for the reaction between an oxygen-reacting gas, such as methane, and oxygen gas to form gases (e.g. carbon monoxide and hydrogen) which will protect the object to be heated. If the object to be heated is, for example, a billet or bar of steel, the hydrocarbon will heat the surface of the object which acts as a catalyst.

Figure 9B:
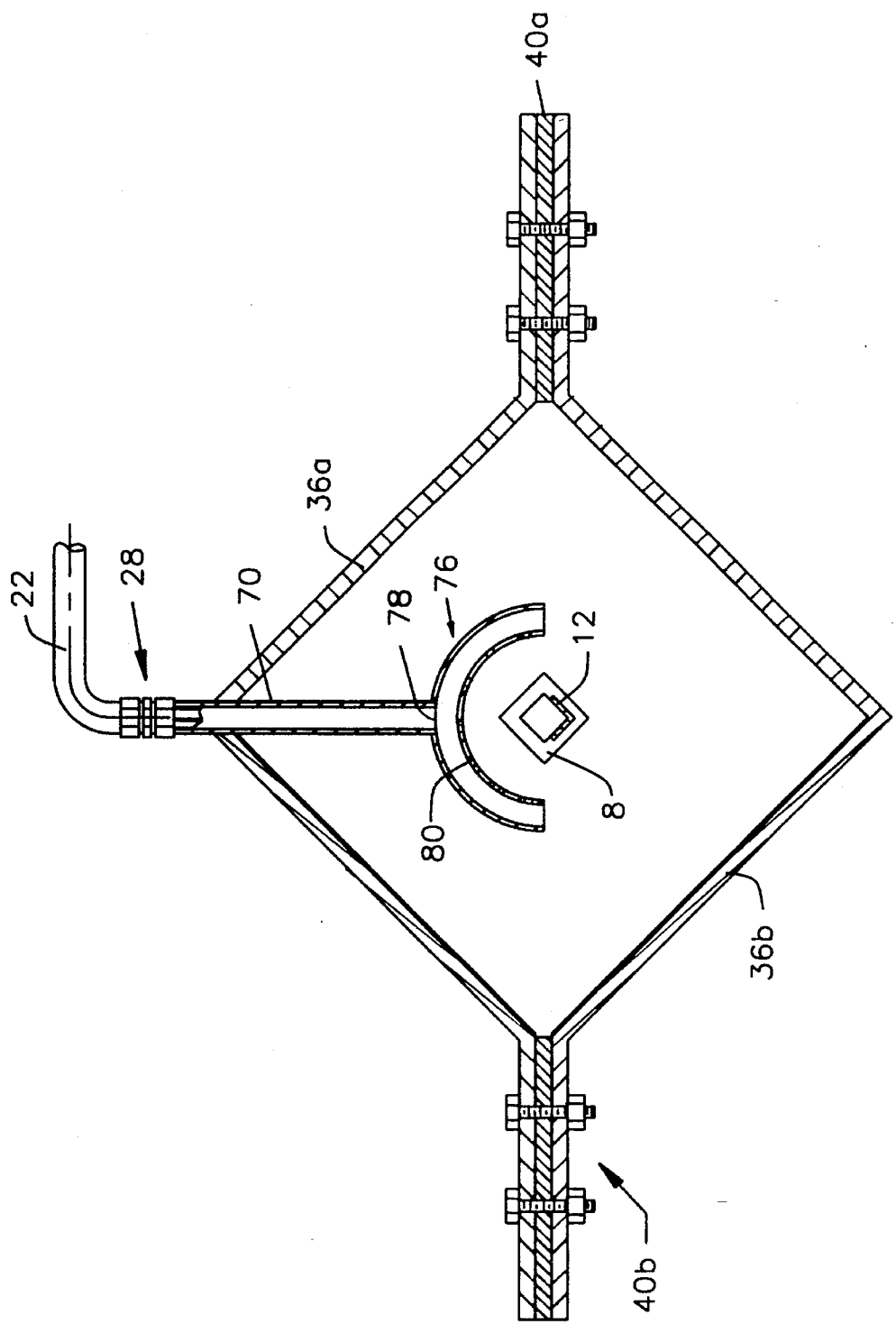
FIG. 9B is a cross-sectional view of an embodiment of the cover similar to that shown in FIG. 9A including a semicircular distribution insert.

The reaction of the oxygen-reacting gas and oxygen ca also be enhanced by increasing the residence time of the gas under the reaction temperature. Referring to FIG. 9B, the extended tube 70 of the embodiment shown in FIG. 9A may be provided with means for increasing the travel path of the gas in proximity to the pathway 8. As shown specifically in FIG. 9B, the travel path of the gas is increased by a semicircular ring 76 having an opening 78 in fluid communication with the extended tube 70. The gas such as a mixture of nitrogen and methane is released from the ring 76 through spaced-apart openings 80. In accordance with the present invention, the residence time of the gas may be increased by employing devices other than the semicircular ring 76. For example, the ring may be extended to a full circle or the device may be in the form of a polyhedron (e.g. hexahedron) or portion thereof.

What is claimed:

1. An induction heating apparatus comprising:
   (a) at least two induction heating coils, each induction heating coil being contained within a separate housing, each housing being aligned in a linear spaced apart relationship to define a pathway for the passage of a part to be heated;
   (b) a cover means enclosing the space between each housing; and
   (c) a tube assembly having entry through at least one of the cover means and into the pathway for transporting an inert gas alone or in combination with an oxygen-reacting gas from a source to the pathway to establish a low oxygen-containing atmosphere therein.

2. The induction heating apparatus of claim 1 wherein the tube assembly comprises a flexible tube connected to a source of the gas and a rigid tube with spaced apart openings extending into the housing.

3. The induction heating apparatus of claim 2 wherein the rigid tube extends to close proximity to the pathway.

4. The induction heating apparatus of claim 3 wherein the tube assembly has openings for release of the inert gas around at least a portion of the circumference of the pathway.

5. The induction heating apparatus of claim 2 wherein the rigid tube is transverse of the pathway.

6. The induction heating apparatus of claim 1 wherein the tube assembly is rotatable.

7. The induction heating apparatus of claim 1 wherein the cover means is reversibly removable from the housing.

8. The induction heating apparatus of claim 7 wherein the cover means comprises first and second cover members attached to each other and means for reversibly disengaging the cover members from each other to provide access to the induction heating coil contained within the housing.

9. The induction heating apparatus of claim 8 wherein the first and second cover members are hingedly attached to each other.

10. The induction heating apparatus of claim 8 wherein the first and second cover members each have first and second ends, at least one said first or second ends of each cover member attached to the other cover member to secure the first and second cover members to each other.

11. The induction heating apparatus of claim 10 wherein at least one of said first or second ends of the cover members are separated from each other by a sealing means.

12. The induction heating apparatus of claim 1 wherein the tube assembly has openings for release of the inert gas around at least a portion of the circumference of the pathway.

13. The induction heating apparatus of claim 1 wherein the cover means comprises a housing made of heat resistant material and having a surface defining the pathway for the passage of the part to be heated, an inlet for transporting an inert gas from a source, distribution means aligned against and following the contour of at least a portion of the surface of the pathway, said distribution means being in fluid communication with the inlet and having at least one opening, where in operation of the apparatus the gas from the source passes through the inlet and distribution means into the pathway to provide said low oxygen-containing atmosphere.

14. The induction heating apparatus of claim 1 wherein the oxygen-reacting gas is a hydrocarbon gas.

15. A method of providing a low oxygen-containing atmosphere to an induction heating apparatus having at least two housings, each housing having at least two induction coils and being aligned in linear spaced-apart relationship to define a pathway for the passage of a part to be heated, and a cover means enclosing the space between the housings, said method comprising introducing an inert gas alone or in combination with an oxygen-reacting gas through a tube assembly extending through at least one of the housings into the pathway.

16. The method of claim 15 comprising extending the tube assembly transversely of the pathway.

17. The method of claim 15 comprising rotating the tube assembly within the housing to adjust the placement of the gas within the pathway.

18. The method of claim 15 further comprising maintaining the induction coil by the method comprising terminating the induction heating operation, removing the cover means, completing maintenance of the induction coils and reinserting the cover means over the space between the housings.

19. The method of claim 15 wherein the cover means comprises first and second members hingedly attached to each other, said method comprising separating said first and second members about said hinged attachment, completing maintenance of the induction heating apparatus and reattaching the first and second members about said housing.

20. The method of claim 15 wherein the cover means comprises a housing made of a heat resistant material and a pathway for passage of the part to be heated, an inlet, a distribution means aligned against the pathway, said process comprising passing the gas from a source through the inlet into the distribution means to distribute the gas within the pathway and form the low oxygen-containing atmosphere therein.

21. The method of claim 20 wherein the gas is a combination of an inert gas and an oxygen-reacting gas, said process comprising releasing the gas from the distribution means in close proximity to the pathway.

* * * * *